Figure 1:
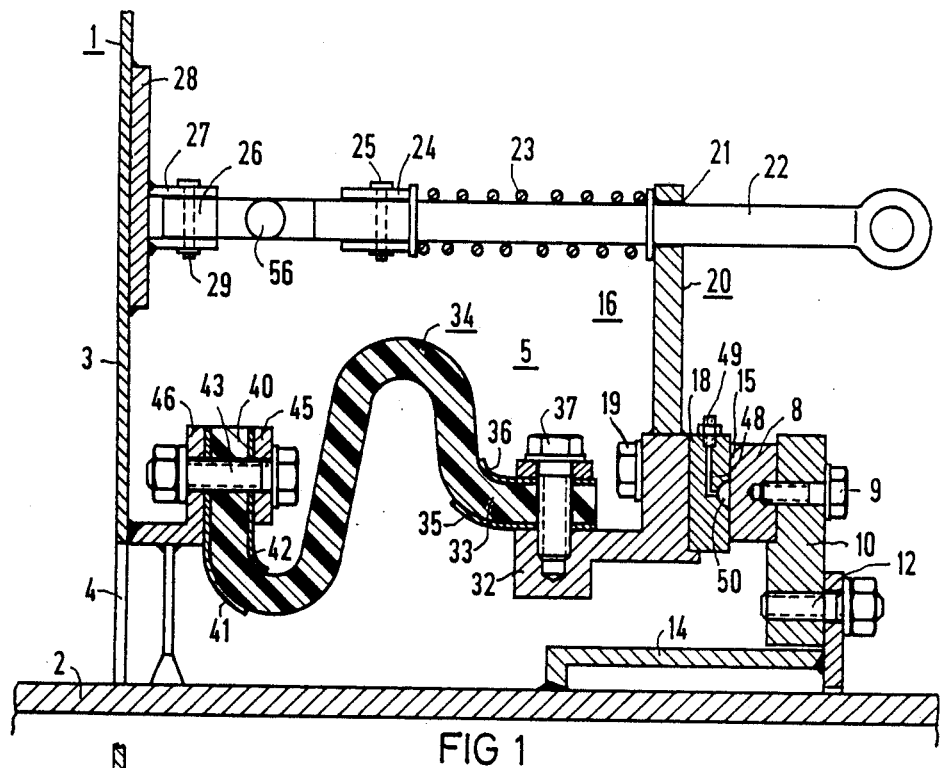

United States Patent [19]

Haberberger

[11] Patent Number: 4,836,560
[45] Date of Patent: Jun. 6, 1989

[54] SEAL

[75] Inventor: Vitus Haberberger, Herzogenaurach, Fed. Rep. of Germany

[73] Assignee: Siemens Aktiengesellschaft, Berlin and Munich, Fed. Rep. of Germany

[21] Appl. No.: 81,233

[22] Filed: Aug. 4, 1987

[30] Foreign Application Priority Data

Aug. 4, 1986 [DE] Fed. Rep. of Germany ....... 3626383

[51] Int. Cl.⁴ .......................... F16J 15/54; F27B 7/24
[52] U.S. Cl. ........................................ 277/88; 432/115
[58] Field of Search ........................... 277/88, 89, 815; 432/115

[56] References Cited

U.S. PATENT DOCUMENTS

| | | | |
|---|---|---|---|
| 2,048,581 | 7/1936 | Weiher | 277/88 |
| 2,434,845 | 1/1948 | Gaffney | 432/115 |
| 2,939,730 | 6/1960 | Turpin | 277/89 |
| 4,193,756 | 3/1980 | Leon | 432/115 X |
| 4,295,824 | 10/1981 | Wens | 432/115 |

Primary Examiner—Donald A. Griffin
Attorney, Agent, or Firm—Herbert L. Lerner; Laurence A. Greenberg

[57] ABSTRACT

A seal for a housing with a housing wall enclosing a rotatable tubular body includes a first sealing ring concentrically surrounding and secured to the tubular body, the first sealing ring having a sealing surface disposed at a right angle to the axis of the tubular body. A retaining device is secured on the housing and movable parallel to the axis of the tubular body. A second opposing sealing ring is secured on the retaining device and spaced from the housing wall defining an interspace therebetween. A spring biases the second sealing ring away from the housing wall and against the sealing surface of the first sealing ring in axial direction of the tubular body and a bellows surrounds the tubular body and tightly closes off the interspace.

9 Claims, 1 Drawing Sheet

SEAL

The invention relates to a seal for a housing enclosing a rotatable tubular body, especially for a drum-type furnace in pyrolysis systems, with contacting sealing bodies subject to spring pressure.

The seal must be capable of absorbing large thermal expansions, especially in the case of the aforementioned drum-type furnaces, because such drums have diameters on the order of a meter and lengths of several meters. As a result, in view of the low-temperature carbonization temperatures of 500°–700° C., thermal expansions of more than 10 cm occur, which must be absorbed without a loss of tightness of the seal. This is due to the fact that in pyrolysis systems, air must be prevented from entering during negative-pressure operation, because the air would cause combustion of the low-temperature carbonization gases. Another strain can arise from a backup of fluid which must not be allowed to escape, on the inlet side of the low-temperature carbonization drum.

Seals used heretofore have been assembled from split segments radially braced with cables, for instance, in order to make a friction ring seal. An axial adaptation is effected by spring force or by pneumatic cylinders. As a result, yet another location requiring sealing exists. This presents further possibilities for problems, especially if an overpressure occurs in the drum in the case of a malfunction.

It is accordingly an object of the invention to provide a seal, which overcomes the hereinafore-mentioned disadvantages of the heretofore-known devices of this general type and which can also be used in other applications, such as in drum-type furnaces in the chemical industry or in ore dressing.

With the foregoing and other objects in view there is provided, in accordance with the invention, a seal for housing with a housing wall enclosing a rotatable tubular body, especially for a drum-type furnace in pyrolysis systems, comprising a first sealing ring concentrically surrounding and secured to the tubular body, the first sealing ring having a sealing surface disposed at a right angle to the axis of the tubular body, retaining means secured on the housing and movable parallel to the axis of the tubular body, a second opposing sealing ring secured on the retaining means and spaced from the housing wall defining an interspace therebetween, spring means biasing the second sealing ring away from the housing wall and against the sealing surface of the first sealing ring in axial direction of the tubular body, and a bellows surrounding the tubular body and tightly closing off the interspace.

According to the invention, axial lengthening is intercepted by a bellows and a seal that is movable in the axial direction can be dispensed with entirely.

In accordance with another feature of the invention, the bellows is formed of plastic, and there are provided shaping plates disposed on the bellows and means for firmly clamping the bellows through the shaping plates. However, the bellows may also be a conventional metal bellows.

In accordance with a further feature of the invention, there is provided at least one flange having a radial fastening plane, the bellows having at least one end attached to the radial fastening plane of the at least one flange. In the case of a plastic bellows, it is recommended that the bellows be corrugated slightly beforehand, which can be accomplished by attaching it at least at one end to a flange having a radial fastening plane. It is thus possible to attain an upward arching that facilitates axial movement of the intrinsically cylindrical plastic bellows.

Radial displacements are absorbed by the sealing surface between the sealing ring and the opposing or complementary sealing ring, which slide against one another; this surface is at right angles to the tube axis. In order to reduce friction, in accordance with an added feature of the invention, one of the sealing rings has a lubricating groove formed therein at the sealing surface. In accordance with an additional feature of the invention, the one sealing ring has a lubricating channel formed therein leading from the lubricating groove to the outside of the one sealing ring. Lubricants which may be used particularly include temperature-resistant greases, such as those based on graphite or molybdenum sulfide.

In accordance with yet another feature of the invention, the retaining means includes a retaining ring supporting the second sealing ring and a plurality of rods distributed about the circumference of the tubular body, the rods being secured on the housing wall and extended parallel to the axis of the tubular body through bores formed in the retaining ring, the spring means being in the form of a plurality of springs each surrounding a respective one of the rods, the springs each having one end braced on the housing wall and another end braced on the retaining ring. The retaining means for the opposing or complementary second ring slides on these rods, in order to compensate for axial movements of the tubular body. Tilting of the retaining ring can be prevented by using a multiplicity of rods. A ball-and-socket joint can furthermore compensate for misalignments.

In accordance with yet a further feature of the invention, the first sealing ring has a given thickness, and there is provided a pipe segment surrounding the tubular body and securing the first sealing ring on the tubular body, the pipe segment having a length being a multiple of the given thickness, as seen in the direction of the axis of the tubular body. With such a pipe segment, high temperatures of the tubular body which may occur and which otherwise could impair the lubricating properties, can be kept away from the sealing ring.

In accordance with a concomitant feature of the invention, the bellows is a metal bellows including the spring means.

Other features which are considered as characteristic for the invention are set forth in the appended claims.

Although the invention is illustrated and described herein as embodied in a seal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
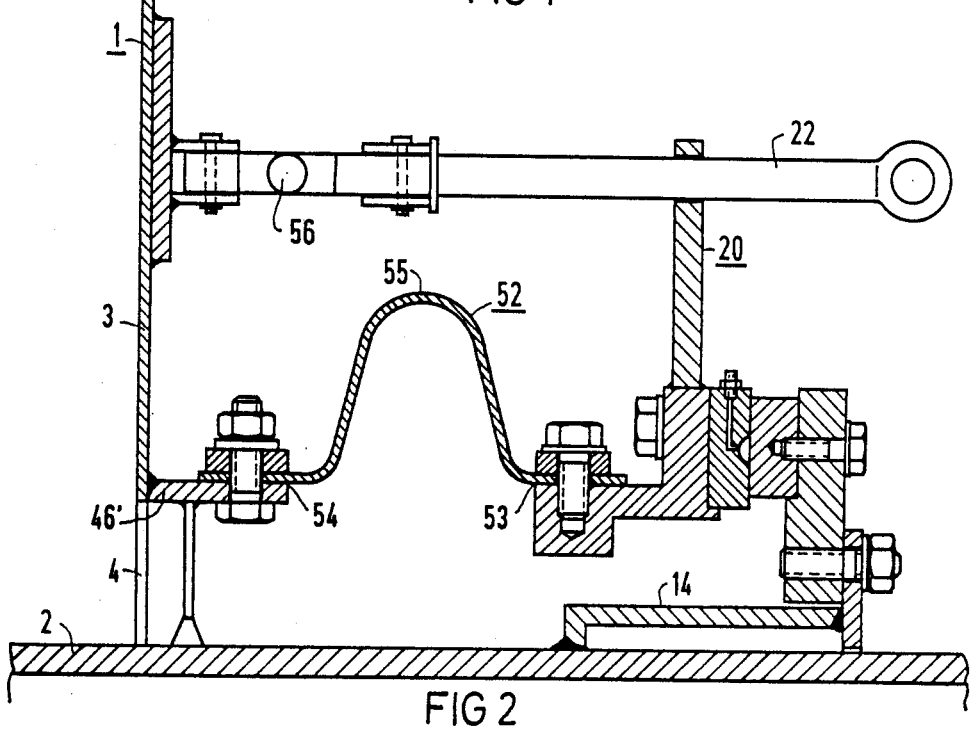

FIGS. 1 and 2 are fragmentary, diagrammatic, cross-sectional views of two embodiments of seals for the low-temperature carbonization drum of a pyrolysis system.

Referring now to the figures of the drawings in detail and first, particularly, to FIG. 1 thereof, there is seen a low-temperature carbonization gas housing 1 for a low-temperature carbonization furnace in which household trash is pyrolytically decomposed at temperatures of approximately 500° C. The only visible portion of the housing 1 is a region in which a rotating low-temperature carbonization drum 2 is introduced in a sealed manner as a tubular body. The drum 2 has a diameter of 60 cm, for example, a wall thickness of 0.7 cm and it represents the discharge tube of a carbonization drum. The wall 3 of the housing 1 is provided with an opening 4. The point where the wall 3 is penetrated is sealed off with a seal according to the invention which is identified as a whole by reference numeral 5, so that even at a negative pressure of 0.002 bar, no atmospheric oxygen that would disrupt the sub-stoichiometric operation and that would cause combustion can get in.

The seal 5 includes a first steel sealing ring 8, which is connected to the drum 2. To this end, the sealing ring 8 is secured to a disk 10 with screws 9 and the disk 10 is in turn screwed to a pipe segment 14 welded to the drum 2 with screws 12. The pipe segment 14 is spaced from and parallel to the wall of the drum 2 over a length that amounts to 5 times the thickness of the sealing ring 8, thereby limiting the thermal action of the drum 2 upon the sealing ring 8. The configuration is also elastic and the strains dictated by the high temperatures are absorbed, so that no deformations result.

The sealing ring 8 is formed of three segments. The ring 8 has a sealing surface 15 which is disposed at right angles to the axis of the drum 2. Pressed against the sealing surface is an opposing or complementary second metal sealing ring 18, which is formed in one piece and is supported by retaining means 16 connected to the housing 1.

The retaining means 16 includes a retaining ring 20, on which the complementary sealing ring 18 is secured with screws 19. The retaining ring 20 has bores 21 formed therein through which it is displaceably mounted on a plurality of rods 22 distributed uniformly about the circumference of the drum 2. The rods 22 carry compression springs 23. One side of each spring presses against the retaining ring 20. The other side of each spring 23 presses against a sheath 24, which is secured on a rod 22 with a pin 25. The free end 26 of each rod 22 engages the inside of a sheath 27, which is welded to the housing wall 1 through an intermediate plate 28. A pin 29 secures the rod 22 in the sheath 27. A ball-and-socket joint 56 is disposed between the sheaths for compensating misalignments that may occur during assembly or during the course of unequal differential expansions.

With the interposition of shaping plates 35 and 36, a screw 37 firmly clamps one end 33 of a plastic bellows 34 to a cylindrical section or shoulder 32 of the retaining ring 20, which faces toward the housing 1. The bellows 34, which may be formed of elastomers, for instance, has a thickness of 2 cm, a length of 20 cm and a diameter of 80 cm. The other end 40 of the bellows 34 is attached to the housing 1 at a radial securing plane. The end 40 is arched outward with shaping plates 41 and 42, which are pressed against a flange 46 that surrounds the opening 4 in the wall 3, with screws 43 and a pressing ring 45. However, especially in the case of slight displacements, the fastening of the bellows 34 to the housing 1 can also be provided in the same manner in which it is fastened to the section 32.

It is apparent that the novel seal only has a single radial sealing surface 15, at which the sealing rings 8 and 18 can slide on one another in the case of different thermal expansions. The resultant friction can be reduced by means of a lubricant, which can be carried through a lubricating channel 48 with a lubricating nipple 49 to a lubricating groove 50 in the middle of the sealing ring 18. The lubricant may be selected in such a way that the seal at the sealing surface 15 is improved.

Any axial lengthening of the drum 2 is absorbed by a deformation of the bellows 34, which can be moved out of the position shown into a stretched position. Thermal expansions of more than 10 cm can be absorbed without entailing excessive force. The movement is effected under the influence of the springs 23, which act with an overall force of 1000 N upon the sealing surface 15. The result is a secure and largely low-wear seal 5.

In the embodiment illustrated in FIG. 2, a metal bellows 52 is disposed between the retaining ring 20 and a flange 46' surrounding the opening 4, instead of using the plastic bellows 34. The metal bellows 52 is in the form of a single-undulation compensator which may be formed of 1.4571 high-grade steel, for example. The metal bellows 52 has a wall thickness of 1 mm, so that it has sufficient flexibility. The ends 53 and 54 of the metal bellows 52 are secured in the same manner with an annular clamping surface, which is concentric to the drum 2. This is because the metal bellows 52 is manufactured with an undulation 55. Metal bellows 52 having a plurality of undulations can also be used, if great changes in length must be absorbed. Given sufficient elasticity of the metal bellows, special springs for pressing against the sealing rings 8, 18 can also be dispensed with. Pressure can also be exerted against the sealing rings 8, 18 by compressed air cylinders.

The foregoing is a description corresponding in substance to German Application No. P 36 26 383.4, dated Aug. 4, 1986, the International priority of which is being claimed for the instant application, and which is hereby made part of this application. Any material discrepancies between the foregoing specification and the aforementioned corresponding German application are to be resolved in favor of the latter.

I claim:

1. Seal for a housing with a housing wall enclosing a rotatable tubular body, comprising a first sealing ring concentrically surrounding and secured to the tubular body, said first sealing ring having a sealing surface disposed at a right angle to the axis of the tubular body, retaining means secured on the housing and movable parallel to the axis of the tubular body, a second opposing sealing ring secured on said retaining means and spaced from the housing wall defining an interspace therebetween, spring means biasing said second sealing ring away from the housing wall and against said sealing surface of said first sealing ring in axial direction of the tubular body, and a bellows surrounding the tubular body and tightly closing off said interspace, said retaining means including a retaining ring supporting said second sealing ring and a plurality of rods distributed about the circumference of the tubular body, said rods being secured on the housing wall and extended parallel to the axis of the tubular body through bores formed in said retaining ring, said spring means being mounted on said rods and having one end braced on the housing wall and another end braced on said retaining ring.

2. Seal according to claim 1, including at least one flange having a radial fastening plane, said bellows having at least one end attached to said radial fastening plane of said at least one flange.

3. Seal according to claim 1, wherein said bellows is formed of plastic, and including shaping plates disposed on said bellows and means for firmly clamping said bellows through said shaping plates.

4. Seal according to claim 1, wherein one of said sealing rings has a lubricating groove formed therein at said sealing surface.

5. Seal according to claim 4, wherein said one sealing ring has a lubricating channel formed therein leading from said lubricating groove to the outside of said one sealing ring.

6. Seal according to claim 1, wherein said spring means are in the form of a plurality of springs each surrounding a respective one of said rods.

7. Seal for a housing with a housing wall enclosing a rotatable tubular body, comprising a first sealing ring with a given thickness concentrically surrounding and secured to the tubular body, said first sealing ring having a sealing surface disposed at a right angle to the axis of the tubular body, retaining means secured on the housing and movable parallel to the axis of the tubular body, a second opposing sealing ring secured on said retaining means and spaced from the housing wall defining an interspace therebetween, spring means biasing said second sealing ring away from the housing wall and against said sealing surface of said first sealing ring in axial direction of the tubular body, a bellows surrounding the tubular body and tightly closing off said interspace, and a pipe segment surrounding the tubular body and securing said first sealing ring on the tubular body, said pipe segment having a length being a multiple of said given thickness, as seen in the direction of the axis of the tubular body.

8. Seal for a housing with a housing wall enclosing a rotatable tubular body, comprising a first sealing ring concentrically surrounding and secured to the tubular body, said first sealing ring having a sealing surface disposed at a right angle to the axis of the tubular body, retaining means secured on the housing and movable parallel to the axis of the tubular body, a second opposing sealing ring secured on said retaining means and spaced from the housing wall defining an interspace therebetween, spring means biasing said second sealing ring away from the housing wall and against said sealing surface of said first sealing ring in axial direction of the tubular body, and a bellows surrounding the tubular body and tightly closing off said interspace, said retaining means including a retaining ring supporting said second sealing ring and a plurality or rods distributed about the circumference of the tubular body, said rods being secured on the housing wall and extended parallel to the axis of the tubular body through bores formed in said retaining ring, said spring means being mounted between said rods and having one end braced on the housing wall and another end braced on said retaining ring.

9. Seal according to claim 8, wherein said bellows is a metal bellows with sufficient elasticity to form said spring means.

* * * * *